(12) United States Patent  
Denneman et al.

(10) Patent No.: US 11,748,142 B2  
(45) Date of Patent: Sep. 5, 2023

(54) HIGH-AVAILABILITY ADMISSION CONTROL FOR ACCELERATOR DEVICES

(71) Applicant: VMware, Inc., Palo Alto, CA (US)

(72) Inventors: Frank Denneman, Purmerend (NL); Duncan Epping, Helmond (NL); Cormac Hogan, Youghal (IE)

(73) Assignee: VMware, Inc., Palo Alto, CA (US)

( * ) Notice: Subject to any disclaimer, the term of this patent is extended or adjusted under 35 U.S.C. 154(b) by 392 days.

(21) Appl. No.: 17/097,542

(22) Filed: Nov. 13, 2020

(65) Prior Publication Data

US 2022/0156099 A1 May 19, 2022

(51) Int. Cl.
*G06F 9/455* (2018.01)
*G06F 9/50* (2006.01)

(52) U.S. Cl.
CPC ........ *G06F 9/45558* (2013.01); *G06F 9/5088* (2013.01); *G06F 2009/4557* (2013.01)

(58) Field of Classification Search
CPC ............................. G06F 9/45558; G06F 21/53
See application file for complete search history.

(56) References Cited

U.S. PATENT DOCUMENTS

| | | | | |
|---|---|---|---|---|
| 9,952,932 B2 * | 4/2018 | Helleren | ............... | G06F 9/5088 |
| 11,144,219 B2 * | 10/2021 | Epping | ................. | G06F 3/0632 |
| 11,553,047 B2 * | 1/2023 | Brooks | ................. | H04L 67/148 |
| 2015/0058663 A1 * | 2/2015 | Schmidt | ................. | G06F 9/455 |
| | | | | 714/6.24 |

\* cited by examiner

*Primary Examiner* — Lewis A Bullock, Jr.
*Assistant Examiner* — Kevin X Lu
(74) *Attorney, Agent, or Firm* — Dinsmore & Shohl LLP

(57) ABSTRACT

The disclosure provides an approach for high-availability admission control. Embodiments include determining a number of slots present on the cluster of hosts. Embodiments include receiving an indication of a number of host failures to tolerate. Embodiments include determining a number of slots that are assigned to existing computing instances on the cluster of hosts. Embodiments include determining an available cluster capacity based on the number of slots present on the cluster of hosts, the number of host failures to tolerate, and the number of slots that are assigned to existing computing instances on the cluster of hosts. Embodiments include determining whether to admit a given computing instance to the cluster of hosts based on the available cluster capacity.

17 Claims, 5 Drawing Sheets

HIGH-AVAILABILITY ADMISSION CONTROL FOR ACCELERATOR DEVICES

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that may be connected to logical overlay networks that may span multiple hosts and are decoupled from the underlying physical network infrastructure. Though certain aspects are discussed herein with respect to VMs, it should be noted that they may similarly be applicable to other suitable VCIs.

Programmable devices, such as field programmable gate arrays (FPGAs), are increasingly common in modern applications as accelerators in a computing system. Graphics processing units (GPUs) are also increasingly used as accelerators. As more companies deliver artificial intelligence (AI) driven services, organizations are deploying accelerators such as GPU and FPGA devices in hosts within their infrastructures for acceleration of AI tasks. Accelerators expose their explicit architecture to an application, allowing machine learning (ML) algorithms to fully utilize the capabilities of these devices. These accelerators are expensive and are relatively new, making them sparse and valuable commodities. ML training processes are resource and time intensive, and any outage during a training process can have a significant impact on the time-to-market of an AI-driven product or service. Today, no form of admission control (e.g., acting to admit or deny launching of a computing entity) is available for computing entities (e.g., VMs) utilizing accelerator devices of the hosts they run on, which could lead to accelerator devices not being available during a failover of a host and, as a result, a VM running on the failed host not being able to be restarted on another host as there is not another host with an available accelerator device.

Accordingly, there is a need in the art for admission control techniques for accelerator devices in networks.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for high-availability admission control in a network. In particular, techniques described herein allow admission control policies to be defined and enforced in a data center that includes accelerator devices in hosts, the accelerator devices capable of being assigned to computing entities (e.g., VCIs running on the hosts) in the network.

In certain aspects, computing entities may rely on accelerator devices to perform certain tasks. For example, a VCI that performs ML training operations may rely on one or more accelerator devices. As such, when these computing entities are deployed in a data center, they must be deployed on hosts that provide the accelerator devices needed by the computing entities. In the event of a host failure, failover techniques generally involve restarting computing entities that were running on the failed host on a different host in the network. However, existing failover techniques do not account for accelerator devices needed by computing entities. For example, there may not be a host with an available accelerator device for use by the VCI, meaning the VCI cannot be restarted. Accordingly, embodiments of the present disclosure provide high-availability admission control for accelerator devices.

An admission control policy may, for instance, specify how many host failures are to be tolerated. Based on this policy, an admission control engine may determine how many accelerator devices need to be reserved as failover capacity on hosts in the network. Accelerator devices that are reserved as failover capacity will not be assigned to new computing entities deployed in the network, and will be removed from the available capacity of the network. If a request is received to deploy a computing entity that requires a certain number of accelerator devices that is greater than the available capacity of the network, the computing entity will not be admitted. Accelerator devices reserved as failover capacity will be used to restart computing entities in the event of a host failure.

Figure 1:
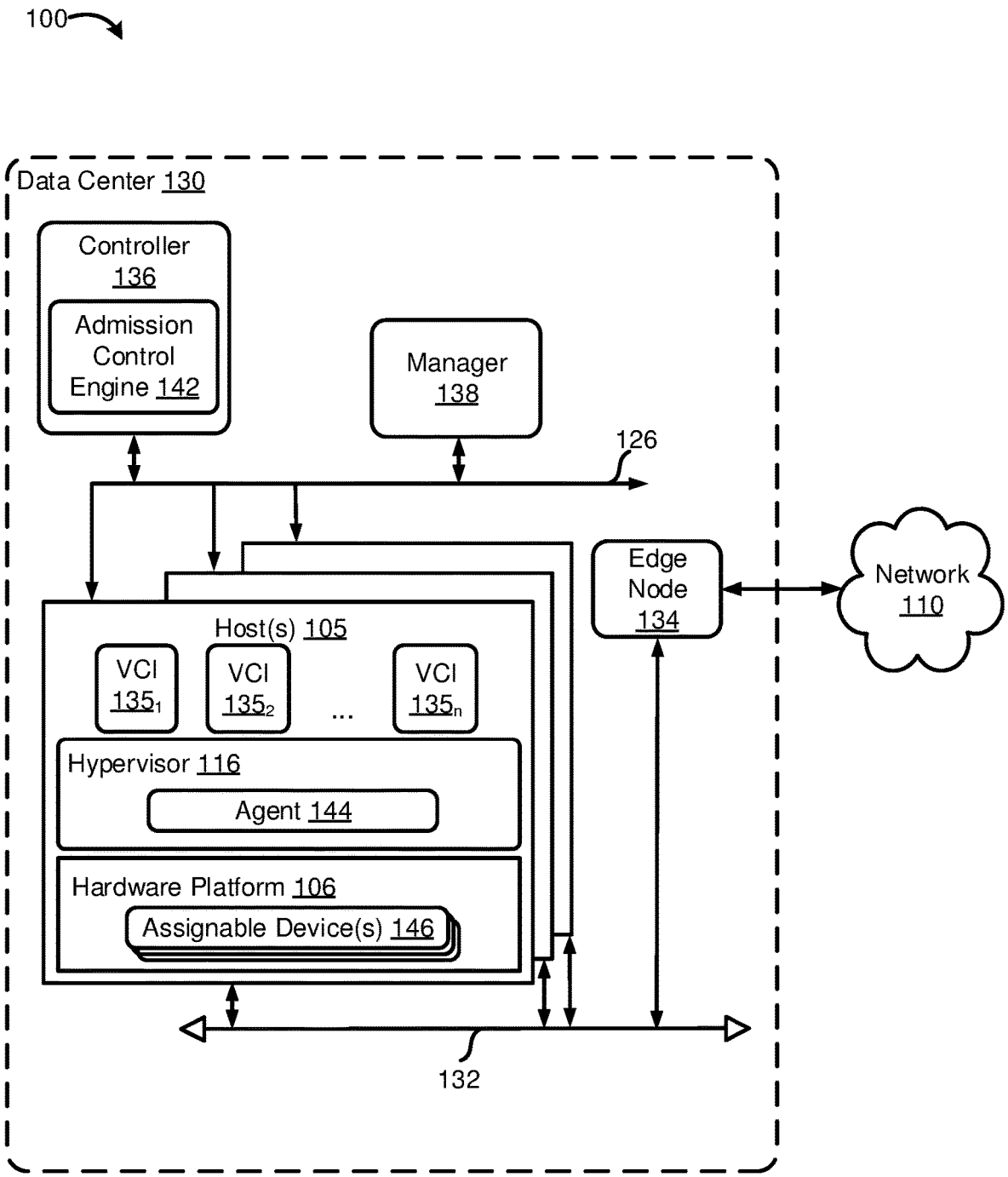
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

It is noted that, while not shown, additional data centers may also be connected to data center 130 via network 110.

Each of hosts 105 may be constructed on a server grade hardware platform 106, such as an x86 architecture platform. Hardware platform 106 comprises one or more assignable devices 145, which may include accelerator devices such as FPGAs and/or GPUs. Though certain aspects are described with respect to accelerator devices, the techniques herein may similarly be applicable to any suitable assignable device (e.g., PCI based device) of a host 105. Hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like. VCIs 135 may be an example of computing entities. For example, a VCI 135 may utilize one or more of assignable devices 146, such as for ML-related operations. In some embodiments, hosts 105 are a cluster of hosts that provide failover capabilities for one another.

In certain aspects, hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. In certain embodiments, applications may run on host 105 without the use of a hypervisor.

Hypervisor 116 comprises an agent 144 that performs certain operations related to high-availability admission control. In some embodiments, agent 144 is an agent of admission control engine 142. In some embodiments, agent 144 keeps track of how many assignable devices 146 are present on host 105, which assignable devices 146 are assigned to VCIs 135, how many assignable devices 146 are reserved as failover capacity, and the like. In certain embodiments, agent 144 performs operations related to restarting computing entities from a failed host 105 onto a new host 105 that includes assignable devices 146 corresponding to the requirements of the computing entities.

Gateway 134 provides VCIs 135 and other components in data center 130 with connectivity to network 110, and is used to communicate with destinations external to data center 130 (not shown). Gateway 134 may be implemented as one or more VCIs, physical devices, and/or software modules running within one or more hosts 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Controller 136 comprises admission control engine 142, which generally performs operations related to high-availability admission control within data center 130. In some embodiments, admission control engine 142 keeps track of how many assignable devices 146 are present on each host 105, which assignable devices 146 on hosts 105 are assigned to VCIs 135, how many assignable devices 146 on hosts 105 are reserved as failover capacity, and the like. For example, admission control engine 142 receives such information from the agent 144 of each host 105. In certain embodiments, admission control engine 142 receives admission control policies (e.g., from an admin, such as via manager 138), such as an indication of a number of host failures to tolerate. Admission control engine 142 may determine assignable devices 146 to reserve as failover capacity based on the admission control policies. In some embodiments, admission control engine 142 enforces admission control policies, such as by determining whether VCIs 135 with specific requirements of assignable devices can be deployed on hosts 105 in view of the available assignable device capacity on hosts 105 (e.g., the total number of unassigned assignable devices minus the number of assignable devices reserved as failover capacity). Admission control policies may be received, for example, from manager 138.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints and requirements of endpoints (e.g., numbers and types of assignable devices required by the endpoints). In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

In some embodiments, as described in more detail below with respect to FIGS. 2-5, admission control policies defined via manager 138 are implemented by various components, such as admission control engine 142 and agents 144 on hosts 105.

Figure 2:
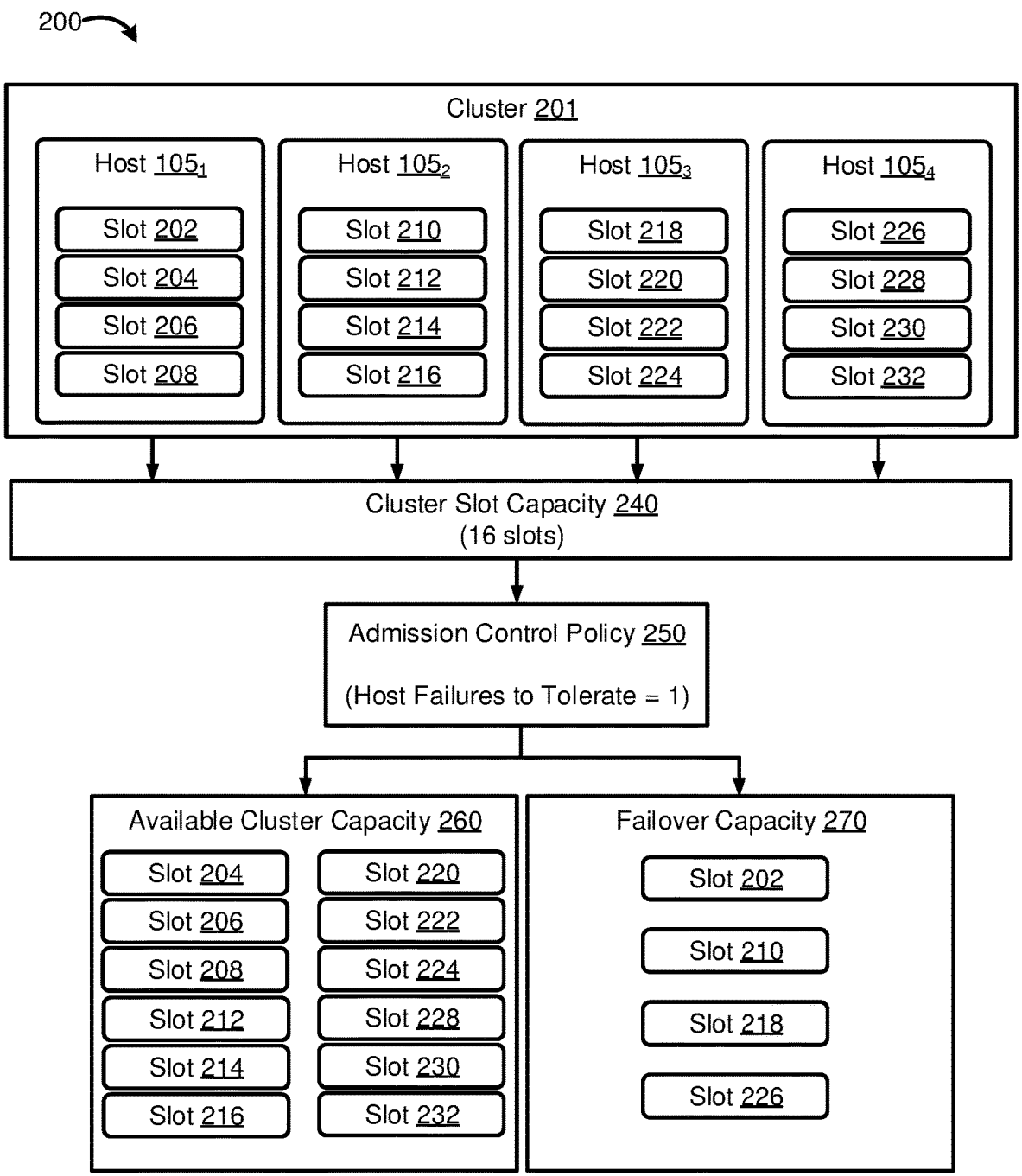
FIG. 2 depicts an example of high-availability admission control according to embodiments of the present disclosure.

FIG. 2 is an illustration 200 of high-availability admission control according to embodiments of the present disclosure. Illustration 200 depicts aspects of data center 130 of FIG. 1, including hosts $105_1$-$105_4$. Cluster 201 includes hosts $105_1$-$105_4$, and represents a set of hosts that provide failover capabilities for one another. Hosts $105_1$-$105_4$ include slots 202-232, each of which represents an assignable device, such as one of assignable devices 146 of FIG. 1.

Assignable devices are generally peripheral component interconnect (PCI) devices, and can be assigned exclusively to a workload (e.g., a VCI) via a PCI pass-through mechanism. PCI pass-through mechanisms allow a guest operating system (OS) on a VCI and applications inside the VCI to interact with a PCI device directly, abstracting device specifics and allowing the PCI device to be identified by attributes rather than by host and bus slot. This flexibility allows for mobility of VCIs across hypervisors on hosts with similar hardware.

A PCI pass-through mechanism (PT) requests an assignable device to describe itself with a key-value attribute. The device driver provides these key-value attributes, which are not manually mutable. PT tracks assignable devices by attribute, and indicates if a VCI is using the device. A VCI describes the assignable devices it requires by declaring attributes in the VCI configuration. During power-on, the system provides both compatibility and capacity checks. An available host must have an unassigned and compatible device available for the VCI in order for the VCI to be placed on the host. Failure on either requirement causes the power-on operation to fail.

High-availability admission control for assignable devices provides a mechanism to ensure there is enough spare capacity in the cluster for failover of VCIs in the event of one or more host failures. It restricts operations that decrease the spare capacity in the cluster, such as the power-on or live-migration of a VCI with assignable devices into the cluster. To specify how assignable devices resources should be reserved for failover, an admission control policy is received and implemented by a central control plane, such as from a management plane. The admission control policy allows the user to identify a number of host failures to tolerate.

If a host fails, the VCIs on the failed host will be restarted on one or more of the remaining hosts to the extent possible. Attributes in the configuration information of the VCIs are used to place each VCI on a compatible host, such as a host that provides assignable devices required by a given VCI. Techniques described herein ensure assignable devices are available for restarts of VCIs from a given number of hosts.

In certain embodiments, an assignable device such as an accelerator device does not allow for fractional sharing. Once assigned, another VCI cannot use it. This allows each assignable device to be treated as a slot, an atomic unit of resources. A host slot capacity refers to the number of slots of a given host, and is determined based on the number of assignable devices of the given host. A cluster slot capacity, such as cluster slot capacity 240, represents the total slots on all slots inside a cluster, such as cluster 201.

Admission control policies, such as admission control policy 250, allow a user to specify a number of host failures to tolerate while still being able to failover active workloads to available devices. For instance, admission control policy 250 specifies that the number of host failures to tolerate is 1.

Various techniques may be used to determine how many slots to reserve as failover capacity based on the number of host failures to tolerate. In one example, a worst-case scenario method is used in which the host slot capacity of the largest host (e.g., the host with the largest number of slots) is used to represent a single host when calculating failures to tolerate. The largest host slot capacity would be multiplied by the number of host failures to tolerate. For example, if the host slot capacity of the largest host is 4 and the number of host failures to tolerate is 2, then the failover capacity may be set to 8 under the worst-case scenario method.

In another less-restrictive example method, the hosts may be ordered according to host slot capacity in descending order from largest to smallest, and the order of the hosts may be used to determine the failover capacity. A number of hosts equal to the number of host failures to tolerate may be selected from the ordered list starting at the beginning of the list, and total number of slots of the selected hosts may be used as the failover capacity. For instance, if the host slot capacity of the largest host is 4, the host slot capacity of the second largest host is 3, and the number of host failures to tolerate is 2, then the failover capacity may be set to 7 under this less-restrictive method.

Failover capacity, such as failover capacity 270, represents the number of slots in a cluster, such as cluster 201, that are reserved for use in restarting VCIs in the event of host failures. Available cluster capacity, such as available cluster capacity 260, represents the number of slots in a cluster, such as cluster 201, that are available to be assigned to new VCIs. In some embodiments, available cluster capacity 260 is determined by subtracting the number of slots reserved as failover capacity 270 and the number of assigned devices from the total cluster slot capacity 240.

In illustration 200, each of hosts $105_1$-$105_4$ in cluster 201 has 4 slots. As such, cluster slot capacity 240 is 16 slots. Admission control policy 250 indicates that the number of host failures to tolerate is 1. Based on admission control policy 250, using either the worst-case scenario method or the less-restrictive method described above, failover capacity 270 is determined to be 4 slots. That is because the largest host slot capacity is 4, as are the host slot capacities of all of hosts $105_1$-$105_4$.

Various methods may be used to determine which slots to reserve as failover capacity 270. For example, all of the slots on a single host may be reserved as failover capacity or the failover capacity may be spread across multiple hosts to ensure high-availability of the failover capacity. In this case, one slot from each host, including slots 202, 210, 218, and 226, is reserved as failover capacity 270.

Available cluster capacity 260 includes all slots in cluster 201 that are not assigned and that are not reserved as failover capacity 270. Thus, available cluster capacity 260 includes slots 204, 206, 208, 212, 214, 216, 220, 222, 224, 228, 230, and 232.

Figure 3:
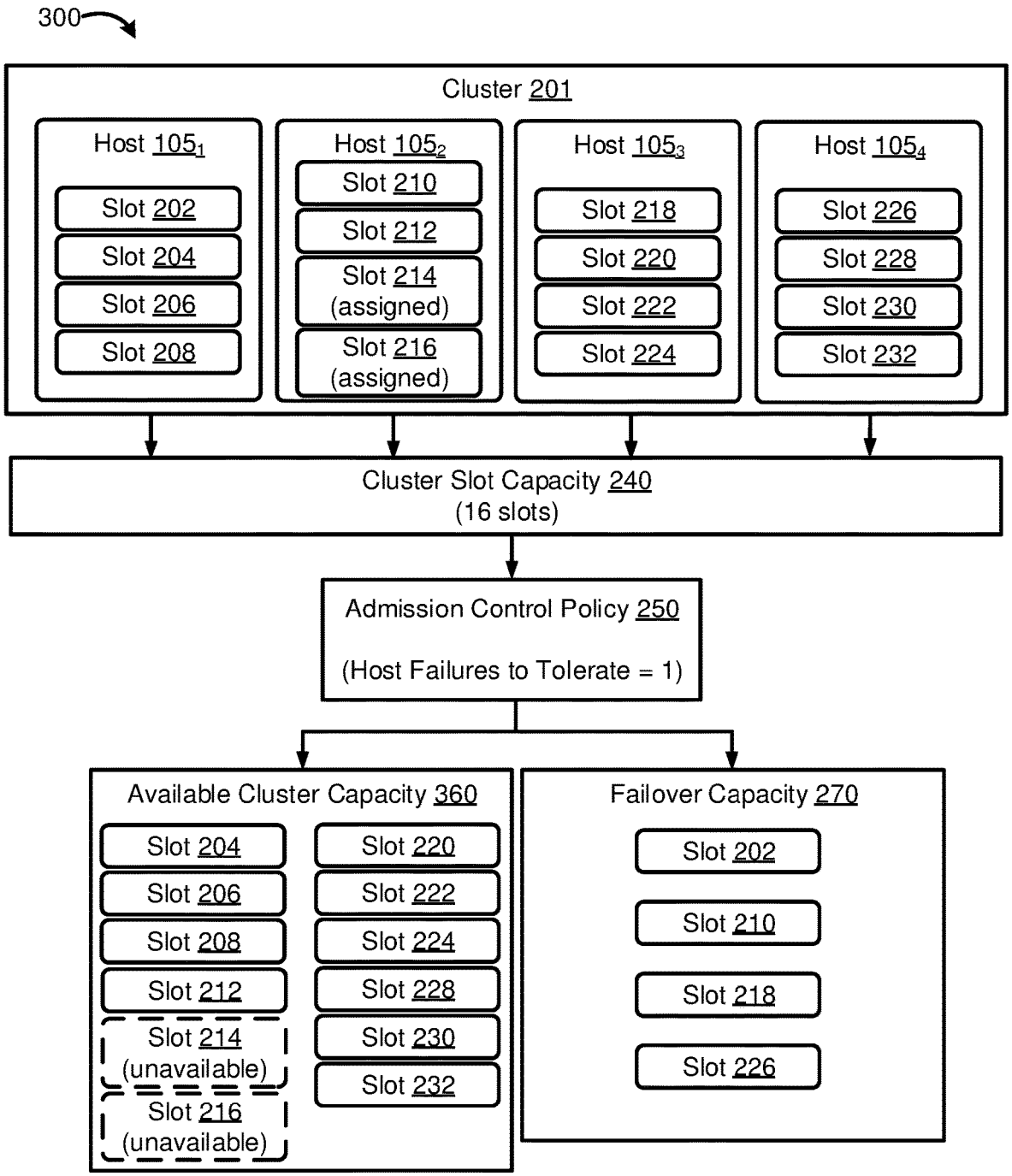
FIG. 3 depicts another example of high-availability admission control according to embodiments of the present disclosure.

FIG. 3 is another illustration 300 of high-availability admission control according to embodiments of the present disclosure. Illustration 300 depicts aspects of data center 130 of FIG. 1, including hosts $105_1$-$105_4$. Illustration 300 includes cluster 201, cluster slot capacity 240, admission control policy 250, and failover capacity 270 of FIG. 2.

In illustration 300, slots 214 and 216 on host $105_2$ have been assigned to one or more VCIs. For example, a VCI requiring two GPUs may have been deployed in cluster 201, and may have been placed on host $105_2$, with assignable devices corresponding to slots 214 and 216 being assigned to the VCI. Thus, slots 214 and 216 are removed from available cluster capacity 360, and are not available to be assigned to other VCIs.

In the event of a failure of host $105_2$, the VCI may be restarted on one of hosts $105_1$, $105_3$, or $105_4$, being assigned to one or more slots reserved as failover capacity 270 on the host.

In some embodiments, to ensure that the failover capacity on a single host is capable of supporting a VCI running in the cluster, a different distribution pattern of the failover capacity across hosts may be selected. For instance, if the largest slot requirement of a VCI running in the cluster is 2 slots, then the failover capacity may be selected from hosts such that 2 slots on a given host are reserved as failover capacity. For example, rather than reserving slots 202, 210, 218, and 226 as failover capacity 270, slots 202, 204, 210, and 212 (e.g., two slots on host $105_1$ and two slots on host $105_2$) may be reserved instead as failover capacity 270. It is noted that other techniques for selecting slots to reserve as failover capacity may be used with techniques described herein.

Figure 4:
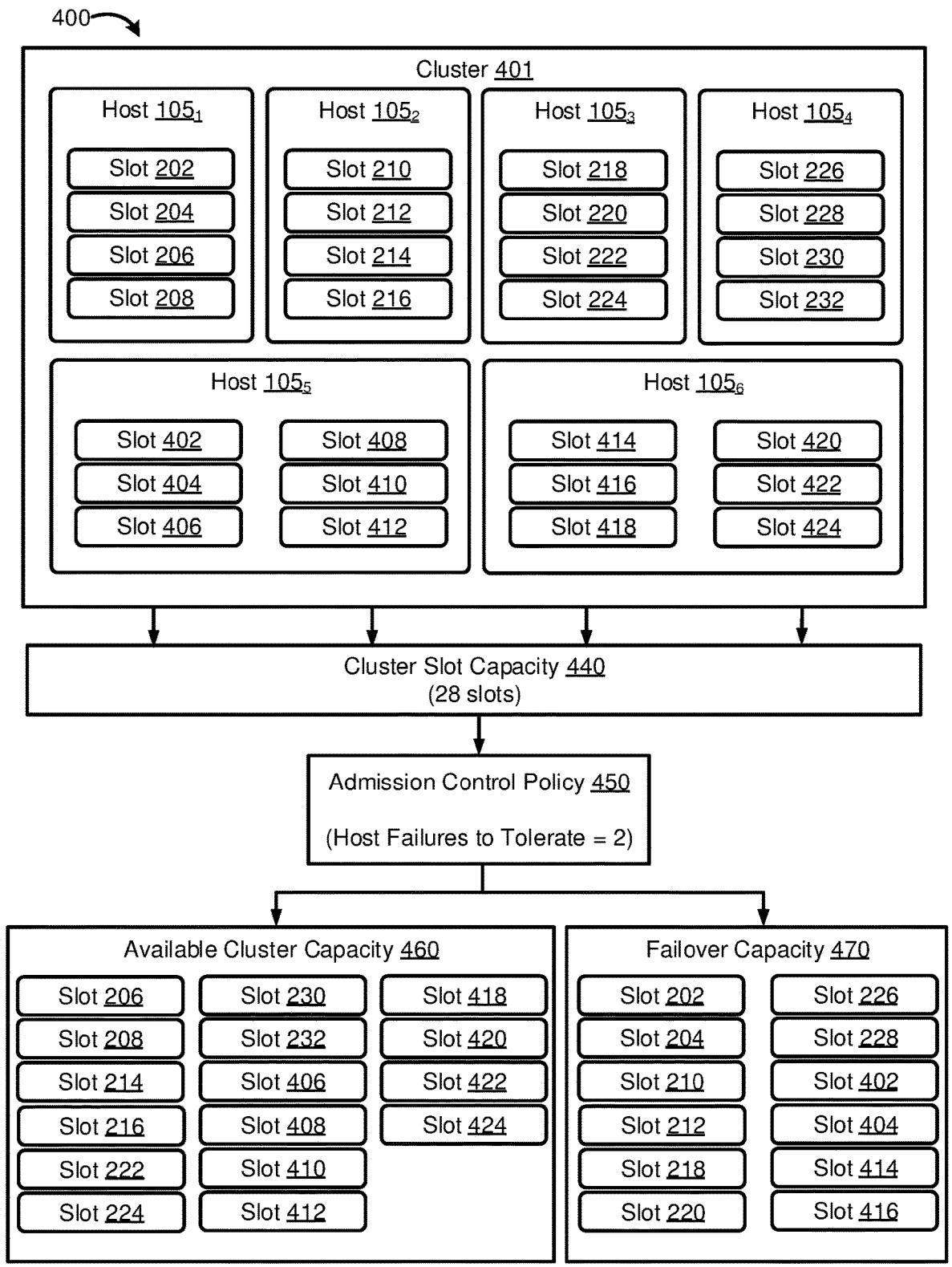
FIG. 4 depicts another example of high-availability admission control according to embodiments of the present disclosure.

FIG. 4 is another illustration 400 of high-availability admission control according to embodiments of the present disclosure. Illustration 400 depicts aspects of data center 130 of FIG. 1, including hosts $105_1$-$105_4$.

In illustration 400, a cluster 401 includes hosts $105_1$-$105_4$ with slots 202-232 of FIGS. 2 and 3, as well as hosts $105_5$ and $105_6$ with slots 402-424. While hosts $105_1$-$105_4$ each include 4 slots, hosts $105_5$ and $105_6$ each include 6 slots. Thus, the cluster slot capacity 440 of cluster 401 is 28 slots.

An admission control policy 450 specifies that the number of host failures to tolerate is 2. Thus, because the largest host slot capacity in cluster 401 is 6 (e.g., because hosts $105_5$ and $105_6$ each have 6 slots), the worst-case scenario method described above results in determining a failover capacity 270 of 12 (e.g., the largest host slot capacity of 6 multiplied by the number of host failures to tolerate of 2). Furthermore, the less-restrictive method described above would also result in a failover capacity 270 of 12 because both the first and the second largest host capacities are 6 (e.g., both hosts $105_5$ and $105_6$ have 6 slots).

Failover capacity 470 includes two slots from each host in the cluster, including slots 202 and 204 from host $105_1$, slots 210 and 212 from host $105_2$, slots 218 and 220 from host $105_3$, slots 226 and 228 from host $105_4$, slots 402 and 404 from host $105_5$, and slots 414 and 416 from host $105_6$. Other distributions of failover capacity across hosts may alternatively be employed. For example, more slots may be reserved from hosts that have higher host slot capacities. In one alternative example, 4 slots are reserved from each of hosts $105_5$ and $105_6$, while 1 slot is reserved from each of hosts $105_1$-$105_4$.

Available cluster capacity 460 includes all slots in cluster 401 that have not been assigned to VCIs and that are not reserved as failover capacity 470, including slots 206, 208, 214, 216, 222, 224, 230, 232, 406, 408, 410, 412, 418, 420, 422, and 424.

Figure 5:
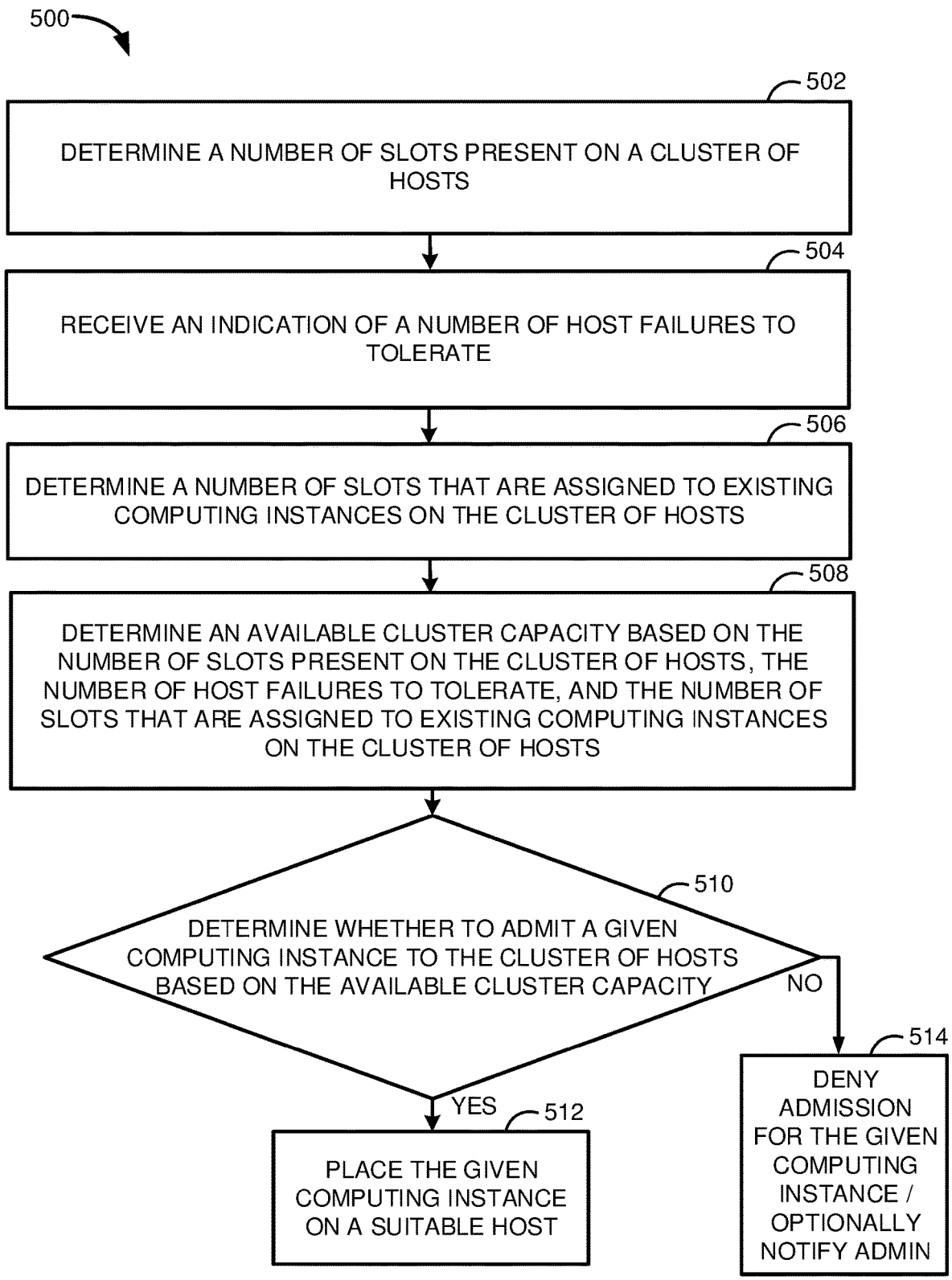
FIG. 5 depicts example operations for high-availability admission control according to embodiments of the present disclosure.

FIG. 5 depicts example operations 500 for high-availability admission control according to embodiments of the present disclosure. For example, operations 500 may be performed by one or more components of data center 130 of FIG. 1, such as admission control engine 142 and/or agent 144 of FIG. 1.

At 502, a number of slots present on a cluster of hosts is determined. For example, admission control engine 142 of FIG. 1 may track how many slots are present on each host as configuration information related to the slots is received by the control plane (e.g., from the management plane), and/or admission control engine 142 of FIG. 1 may receive information about numbers of slots present on each host from an agent 144 of FIG. 1 on each host.

At 504, an indication of a number of host failures to tolerate is received. For example, admission control engine 142 of FIG. 1 may receive an admission control policy from a user via the management plane that specifies the number of host failures to tolerate. In some embodiments, there may be a default number of host failures to tolerate in the absence of an explicit admission control policy.

At 506, a number of slots that are assigned to existing computing instances on the cluster of hosts is determined. If no slots are currently assigned to existing computing instances (e.g., VCIs), then the number of slots that are assigned to existing computing instances on the cluster of hosts is 0.

At 508, an available cluster capacity is determined based on the number of slots present on the cluster of hosts, the number of host failures to tolerate, and the number of slots that are assigned to existing computing instances on the cluster of hosts. For example, the available cluster capacity may be determined by subtracting the number of host failures to tolerate and the number of slots that are assigned to existing computing instances on the cluster of hosts from the number of slots present on the cluster of hosts.

At 510, a determination is made of whether to admit a given computing instance to the cluster of hosts based on the available cluster capacity. For example, slot requirements of the given computing instance may be determined (e.g., from configuration information of the computing instance) and compared with attributes of slots included in the available cluster capacity. Slot requirements refer to a number and type of assignable devices required by a given computing instance. If given slots in the available cluster capacity that correspond to the slot requirements of the computing instance are available on a given host, then, at 512, the computing instance may be admitted to the cluster of hosts and placed on the given host, with the given slots being assigned to the computing instance. On the other hand, if slots in the available cluster capacity that correspond to the slot requirements of the computing instance are not available on any host in the cluster, then, at 514, admission is denied for the computing instance. In some embodiments, a notification may be generated, such as to an administrator (e.g., via the management plane), indicating that admission was denied for the computing instance. In certain embodiments, the notification may include details indicating why admission was denied (e.g., there was no host in the cluster with a sufficient number of available slots).

In one example, with respect to FIG. 4, a request is received to deploy a first VCI in cluster 401, and configuration information for the VCI indicates that four assignable devices are required for the VCI (e.g., indicating a slot requirement of four). Two hosts $105_5$ and $105_6$ include four available slots (respectively, slots 406, 408, 410, and 412 and slots 418, 420, 422, and 424), and so the VCI may be admitted to cluster 401 and placed on one of hosts $105_5$ and $105_6$. Likewise, a second VCI requiring four assignable devices may be admitted and placed on the other of hosts $105_5$ and $105_6$. At this point, however, a third VCI requiring four assignable devices may not be admitted to cluster 401, as there would be no remaining hosts with four available slots that have not been assigned or reserved as failover capacity. Thus, the third VCI may be denied admission to the cluster, and a notification may generated indicating that the third VCI was not admitted and including details of why admission was denied. It is noted that while some embodiments involve reserving specific slots on specific hosts as failover capacity, alternative embodiments may involve simply reserving a given number of slots as failover capacity without reference to specific slots. For example, VCIs may be placed on hosts freely as long as the total number of unassigned slots in the cluster does not fall below the number of slots reserved as failover capacity.

In some embodiments, determining the available cluster capacity comprises identifying a plurality of slots to reserve as failover capacity based on the number of host failures to tolerate.

In certain embodiments, determining the plurality of slots to reserve based on the number of host failures to tolerate comprises identifying a particular host with a largest slot capacity of the cluster of hosts and multiplying a slot capacity of the particular host by the number of host failures to tolerate.

In some embodiments, determining the plurality of slots to reserve based on the number of host failures to tolerate comprises: sorting the cluster of hosts according to slot capacity; selecting a subset of the cluster of hosts based on the sorting, wherein a number of hosts in the subset is equal to the number of host failures to tolerate; and determining a total slot capacity of the subset.

In certain embodiments, the plurality of slots to reserve as failover capacity are located on more than one host of the cluster of hosts.

Some embodiments further comprise determining a failure of a first host of the cluster of hosts and restarting one or more computing entities from the first host on one or more additional hosts of the cluster of hosts based on the plurality of hosts reserved as failover capacity.

In certain embodiments, determining the number of slots present on the cluster of hosts comprises determining how many accelerator devices are present on each host of the cluster of hosts.

In some embodiments, determining whether to admit the given computing instance to the cluster of hosts based on the available cluster capacity comprises determining whether the available cluster capacity includes a set of slots corresponding to slot requirements of the given computing entity.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of high-availability admission control for a cluster of hosts, comprising:

determining a number of slots present on the cluster of hosts, each of the slots present on the cluster of hosts corresponding to a corresponding assignable device on a corresponding host of the cluster of hosts;

receiving an indication of a number of host failures to tolerate, wherein the number of host failures to tolerate is at least one host failure to tolerate;

determining a reserve number of slots to reserve on the cluster of hosts as failover capacity based on the number of host failures to tolerate and slot capacity associated with one or more hosts of the cluster of hosts;

determining corresponding slot requirements for a plurality of VCIs running on the cluster of hosts, the corresponding slot requirements indicating a number of slots required for operation for each of the plurality of VCIs;

determining a largest slot requirement among the corresponding slot requirements, wherein the largest slot requirement is at least two slots;

reserving the reserve number of slots on the cluster of hosts as failover capacity, the reserving comprising:
  determining a host of the cluster of hosts that has a number of available slots equal to at least the largest slot requirement; and
  reserving, on the host, a plurality of available slots of the host as failover capacity, a number of the plurality of available slots of the host being equal to at least the largest slot requirement;

determining a number of slots that are assigned to existing computing instances on the cluster of hosts;

determining an available cluster capacity based on the number of slots present on the cluster of hosts, the reserve number of slots, and the number of slots that are assigned to existing computing instances on the cluster of hosts;

determining whether to admit a given computing instance to the cluster of hosts based on the available cluster capacity; and in response to determining to admit the given computing instance to the cluster of hosts, executing the admitted given computing instance on the cluster of hosts.

2. The method of claim 1, wherein determining the reserve number of slots based on the number of host failures to tolerate comprises identifying a particular host with a largest slot capacity of the cluster of hosts and multiplying a slot capacity of the particular host by the number of host failures to tolerate.

3. The method of claim 1, wherein determining the reserve number of slots based on the number of host failures to tolerate comprises:
  sorting the cluster of hosts according to slot capacity;
  selecting a subset of the cluster of hosts based on the sorting, wherein a number of hosts in the subset is equal to the number of host failures to tolerate; and
  determining a total slot capacity of the subset.

4. The method of claim 1, wherein reserving the reserve number of slots on the cluster of hosts comprises reserving the reserve number of slots across more than one host of the cluster of hosts.

5. The method of claim 1, further comprising:
  determining a failure of a first host of the cluster of hosts; and
  restarting one or more computing entities from the first host on one or more additional hosts of the cluster of hosts on which the reserve number of slots are reserved.

6. The method of claim 1, wherein determining the number of slots present on the cluster of hosts comprises determining how many accelerator devices are present on each host of the cluster of hosts.

7. The method of claim 1, wherein determining whether to admit the given computing instance to the cluster of hosts based on the available cluster capacity comprises determining whether the available cluster capacity includes a set of slots corresponding to slot requirements of the given computing instance.

8. A system, comprising:
  one or more processors; and
  memory comprising instructions that, when executed by the one or more processors, cause the system to perform a method of high-availability admission control for a cluster of hosts, the method comprising:
    determining a number of slots present on the cluster of hosts, each of the slots present on the cluster of hosts corresponding to a corresponding assignable device on a corresponding host of the cluster of hosts;
    receiving an indication of a number of host failures to tolerate, wherein the number of host failures to tolerate is at least one host failure to tolerate;
    determining a reserve number of slots to reserve on the cluster of hosts as failover capacity based on the number of host failures to tolerate and slot capacity associated with one or more hosts of the cluster of hosts;
    determining corresponding slot requirements for a plurality of VCIs running on the cluster of hosts, the corresponding slot requirements indicating a number of slots required for operation for each of the plurality of VCIs;
    determining a largest slot requirement among the corresponding slot requirements, wherein the largest slot requirement is at least two slots;
    reserving the reserve number of slots on the cluster of hosts as failover capacity, the reserving comprising:
      determining a host of the cluster of hosts that has a number of available slots equal to at least the largest slot requirement; and
      reserving, on the host, a plurality of available slots of the host as failover capacity, a number of the plurality of available slots of the host being equal to at least the largest slot requirement;
    determining a number of slots that are assigned to existing computing instances on the cluster of hosts;
    determining an available cluster capacity based on the number of slots present on the cluster of hosts, the reserve number of slots, and the number of slots that are assigned to existing computing instances on the cluster of hosts;
    determining whether to admit a given computing instance to the cluster of hosts based on the available cluster capacity; and
    in response to determining to admit the given computing instance to the cluster of hosts, executing the admitted given computing instance on the cluster of hosts.

9. The system of claim 8, wherein determining the reserve number of slots based on the number of host failures to tolerate comprises identifying a particular host with a largest slot capacity of the cluster of hosts and multiplying a slot capacity of the particular host by the number of host failures to tolerate.

10. The system of claim 8, wherein determining the reserve number of slots based on the number of host failures to tolerate comprises:
  sorting the cluster of hosts according to slot capacity;

selecting a subset of the cluster of hosts based on the sorting, wherein a number of hosts in the subset is equal to the number of host failures to tolerate; and determining a total slot capacity of the subset.

11. The system of claim 8, wherein reserving the reserve number of slots on the cluster of hosts comprises reserving the reserve number of slots across more than one host of the cluster of hosts.

12. The system of claim 8, wherein the method further comprises:

determining a failure of a first host of the cluster of hosts; and restarting one or more computing entities from the first host on one or more additional hosts of the cluster of hosts on which the reserve number of slots are reserved.

13. The system of claim 8, wherein determining the number of slots present on the cluster of hosts comprises determining how many accelerator devices are present on each host of the cluster of hosts.

14. The system of claim 8, wherein determining whether to admit the given computing instance to the cluster of hosts based on the available cluster capacity comprises determining whether the available cluster capacity includes a set of slots corresponding to slot requirements of the given computing instance.

15. A non-transitory computer-readable medium comprising instructions that, when executed by one or more processors of a computing system, cause the computing system to perform a method of high-availability admission control for a cluster of hosts, the method comprising:

determining a number of slots present on the cluster of hosts, each of the slots present on the cluster of hosts corresponding to a corresponding assignable device on a corresponding host of the cluster of hosts;

receiving an indication of a number of host failures to tolerate, wherein the number of host failures to tolerate is at least one host failure to tolerate;

determining a reserve number of slots to reserve on the cluster of hosts as failover capacity based on the number of host failures to tolerate and slot capacity associated with one or more hosts of the cluster of hosts;

determining corresponding slot requirements for a plurality of VCIs running on the cluster of hosts, the corresponding slot requirements indicating a number of slots required for operation for each of the plurality of VCIs;

determining a largest slot requirement among the corresponding slot requirements, wherein the largest slot requirement is at least two slots;

reserving the reserve number of slots on the cluster of hosts as failover capacity, the reserving comprising:

determining a host of the cluster of hosts that has a number of available slots equal to at least the largest slot requirement; and reserving, on the host, a plurality of available slots of the host as failover capacity, a number of the plurality of available slots of the host being equal to at least the largest slot requirement;

determining a number of slots that are assigned to existing computing instances on the cluster of hosts;

determining an available cluster capacity based on the number of slots present on the cluster of hosts, the reserve number of slots, and the number of slots that are assigned to existing computing instances on the cluster of hosts;

determining whether to admit a given computing instance to the cluster of hosts based on the available cluster capacity; and in response to determining to admit the given computing instance to the cluster of hosts, executing the admitted given computing instance on the cluster of hosts.

16. The non-transitory computer-readable medium of claim 15, wherein determining the reserve number of slots based on the number of host failures to tolerate comprises identifying a particular host with a largest slot capacity of the cluster of hosts and multiplying a slot capacity of the particular host by the number of host failures to tolerate.

17. The non-transitory computer-readable medium of claim 15, wherein determining the reserve number of slots based on the number of host failures to tolerate comprises:

sorting the cluster of hosts according to slot capacity;

selecting a subset of the cluster of hosts based on the sorting, wherein a number of hosts in the subset is equal to the number of host failures to tolerate; and determining a total slot capacity of the subset.

* * * * *